Nov. 10, 1959    H. L. GIWOSKY    2,911,879
COMPARATOR FOR SUPERPOSING IMAGE OF A GRID
ON THE IMAGE OF AN OBJECT
Filed July 15, 1955    2 Sheets-Sheet 1

INVENTOR.
HARRY L. GIWOSKY
BY
John W. Michael
ATTORNEY

United States Patent Office 2,911,879
Patented Nov. 10, 1959

2,911,879

COMPARATOR FOR SUPERPOSING IMAGE OF A GRID ON THE IMAGE OF AN OBJECT

Harry L. Giwosky, Milwaukee, Wis., assignor to David White Company, Milwaukee, Wis., a corporation of Wisconsin Application July 15, 1955, Serial No. 522,308

3 Claims. (Cl. 88—14)

This invention relates to a novel comparator. As distinct from conventional comparators in which the comparator grid or screen is placed substantially on the object to be measured or compared the present comparator places an image of the grid or screen over the object so that access to the object is unimpaired. Furthermore, the present comparator makes it quite easy to employ custom-made grids or reference drawings in the comparison and the grids or drawings can be made readily.

The principal object of this invention is to provide a comparator which is easier and more convenient to use than prior comparators.

Another object is to provide a comparator in which easily made grids or drawings can be interchanged with other grids.

In carrying out this invention a frame carries an eyepiece and a beam splitter which permits simultaneous viewing of an object on the axis of the eyepiece and a grid or the like on an axis normal to the first axis. The beam splitter positions the grid image over the object to permit accurate measurement or comparison without interfering with access to the object, thus allowing the object to be moved freely under the apparent grid.

Other objects and advantages will be pointed out in, or be apparent from, the specification and claims, as well obvious modifications of the two embodiments shown in the drawings in which:

Figure 1:
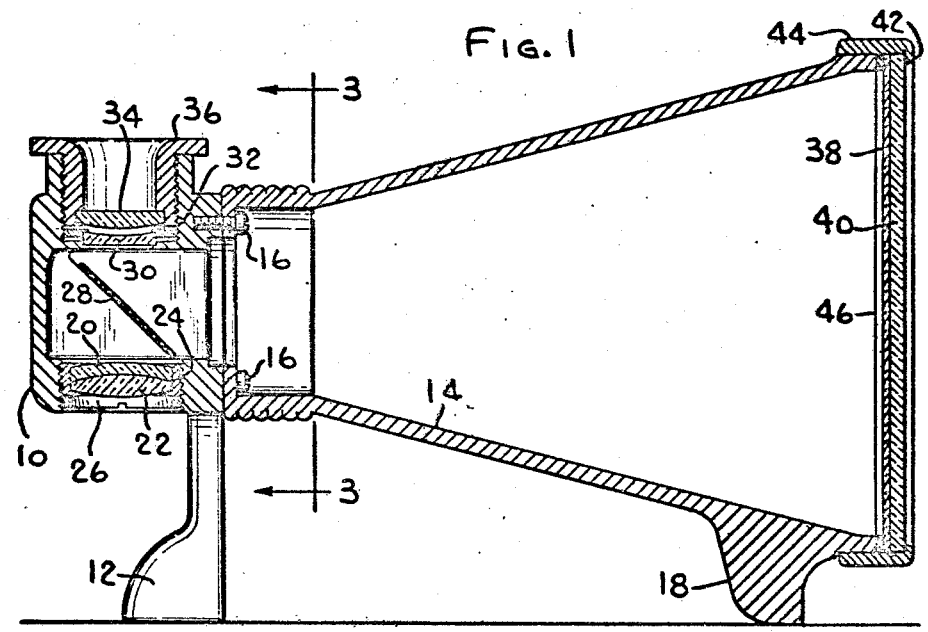
Fig. 1 is a vertical section through one embodiment of this invention.
Figures 2, 3:
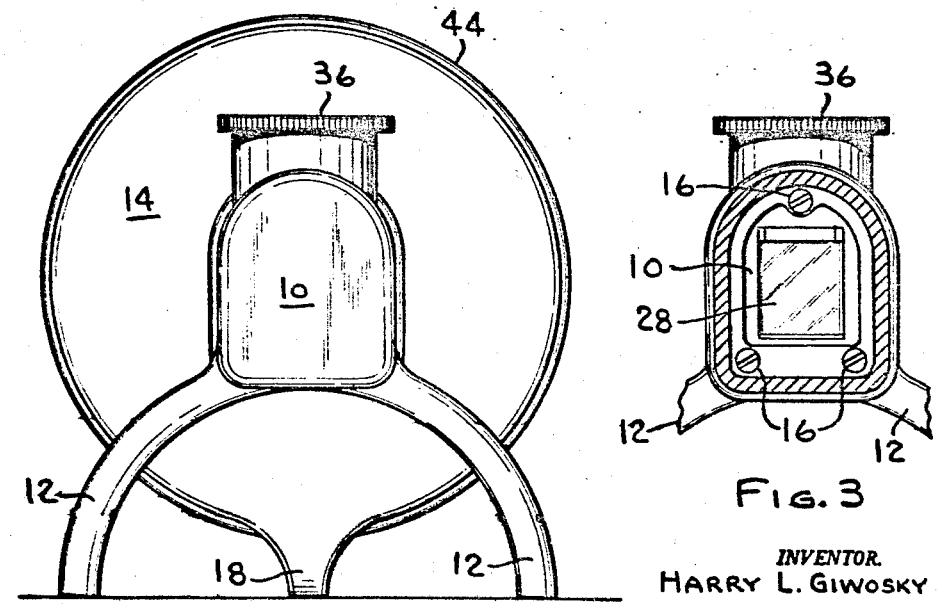
Fig. 2 is an end view of the comparator.
Fig. 3 is a section taken on line 2—2 in Fig. 1.
Figure 4:
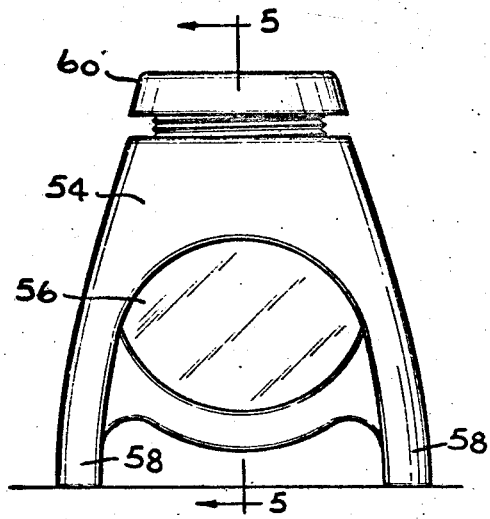
Fig. 4 is an end view of a second modification.
Figure 5:
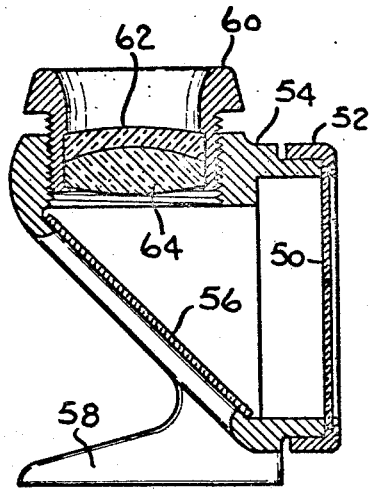
Fig. 5 is a section on line 5—5 in Fig. 4.
Figure 6:
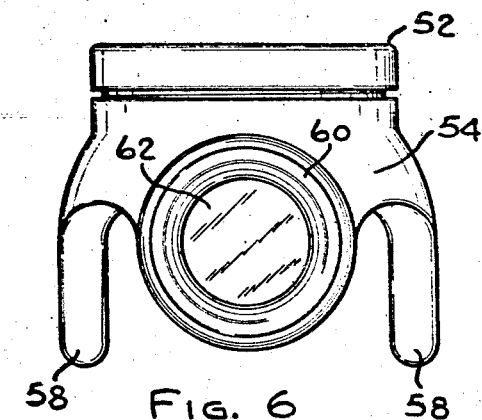
Fig. 6 is a view of the second modification from the right end as viewed in Fig. 5.
Figure 8:
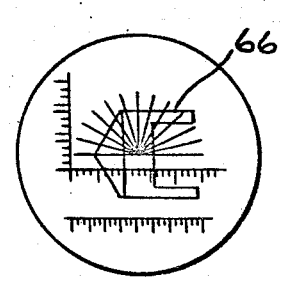
Fig. 8 is a view showing the manner in which the grid is seen over the object when looking through the eyepiece.

Referring now to the drawings in detail, the modification shown in Figs. 1 to 3 permits use of an enlarged grid which permits of greater accuracy in the grid itself. The comparator includes a body 10 having spread-apart legs 12 between which the object to be compared is placed. A horn or frusto-conical member 14 is mounted on the body by screws 16 and has a leg 18 which also rests on the horizontal support. A cemented doublet 20, 22 is mounted in ring 24 which is threaded into the underside of body 10 and retained therein by lock ring 26. The beam splitter 28 is positioned above the doublet at 45° to the axis of the lens. The single lens 30 is fixed in the body by threaded ring 32 while the focusing lens element 34 is fixed in eyepiece 36 mounted in the body on coarse threads for focusing.

Two glass or plastic panels 38, 40 are retained against lip 42 on sleeve 44 by a snap ring 46 and the sleeve fits snugly on the cylindrical surface at the end of the horn. One of the panels may have the grid or other indicia engraved thereon and the type of mounting employed permits the grid to be rotated. If desired, plain panels may be used and a drawing on tracing paper or the like can be sandwiched between the panels. As will be explained more fully hereinafter, the grid or drawing is on a large scale which, in the case of a drawing, makes it quite feasible to make a satisfactory drawing against which a part can be compared.

Light from the object being compared travels through the doublet lens 20, 22, the beam splitter 28 and the lenses 30 and 34 while light coming from the grid is reflected by the beam splitter up through lenses 30 and 34. To the eye it appears that the grid is directly over the object while in fact the object is freely accessible for movement etc. The drawing or grid may be three times size, for example, and doublet 20, 22 enlarges the object image so the object and the grid appear to the same enlarged scale through the eyepiece. Therefore, the doublet 20, 22 is greater power than the power of lenses 30, 34.

Figs. 4 to 8 show another modification which has a grid 50 of 1:1 size cemented or otherwise fixed in sleeve 52 which fits on the cylindrical portion of body 54. Beam splitter 56 is fixed in the body with the space beneath the splitter open between feet 58, 58 for placement of an object for comparison. The eyepiece 60 threadably mounts in the body and carries doublet 62, 64. The doublet is of high power and enlarges the grid and object images equally. The object is, of course, viewed through the splitter while the grid is reflected by the splitter into the doublet.

Figure 7:
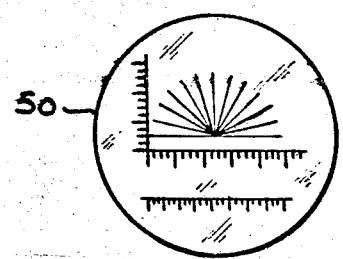
Fig. 7 is a view of a representative grid as might be used in this comparator.

A representative grid is shown in Fig. 7 but it is to be understood grids can contain any desired information. This particular grid would appear superimposed on the device 66 as in Fig. 8 when the device is viewed through the comparator. It will be appreciated that the grid should be well illuminated so it shows up well. The grid may be glass or plastic and may be transparent or translucent. In the claims transparent and translucent are used interchangeably. As a matter of fact the panel could be opaque with the grid etched on the inside face of the panel if supplemental light were provided inside the comparator.

Although but two embodiments of the present invention have been illustrated and described, it will be apparent to those skilled in the art that various changes and modifications may be made therein without departing from the spirit of the invention or from the scope of the appended claims.

I claim:

1. A comparator comprising, a frame, an eyepiece mounted on said frame on a vertical axis, a beam splitter mounted in the frame and intersecting said vertical axis to pass light from an object on said vertical axis to the eyepiece, and to reflect light from another axis into the eyepiece, a lens system mounted in said frame and arranged on said vertical axis, said lens system including a lens on each side of said beam splitter, a hollow laterally extending arm on said frame, a translucent grid mounted adjacent the end of said hollow arm remote from said vertical axis and normal to said another axis, said grid being scaled larger than 1:1 and the lens closest the sighted object being of sufficient power to increase the apparent image of the object to the same scale as the grid, and mounting means for said grid rotatably supported on said hollow arm.

2. A comparator comprising, a frame including a body portion having spaced supports between which the object to be compared is placed, an eyepiece mounted on the top of said body portion on a vertical axis, a hollow frusto-conical member fastened at the small end thereof to said body portion and extending laterally therefrom, a translucent grid mounted at the large end of said frusto-conical member and disposed on a horizontal axis intersecting said vertical axis, a beam splitter mounted in said body portion at the intersection of said axes to pass light from an object on said vertical axis into the eyepiece and to reflect light from said grid into said eyepiece, said grid being scaled larger than 1:1, and a positive power lens mounted in said body portion on said vertical axis between said beam splitter and the sighted objects of sufficient power to increase the apparent image of the object to the same scale as the grid.

3. A comparator according to claim 2 in which said grid is mounted on said frame for rotation about said horizontal axis.

References Cited in the file of this patent

UNITED STATES PATENTS

| | | |
|---|---|---|
| 2,048,879 | Moran | July 28, 1936 |
| 2,404,770 | Bennett et al. | July 30, 1946 |
| 2,423,370 | Butscher | July 1, 1947 |
| 2,431,666 | Fassin | Nov. 25, 1947 |
| 2,488,146 | Steinhaus | Nov. 15, 1949 |
| 2,674,152 | Wilkinson | Apr. 6, 1954 |
| 2,765,704 | Mottu | Oct. 9, 1956 |